Figure 1:
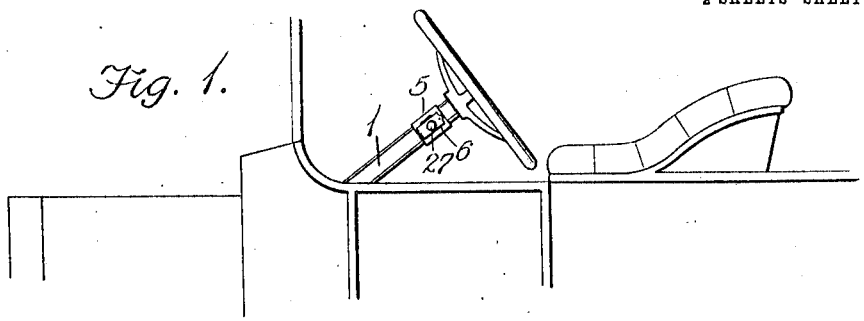

P. R. POHLER.
AUTOMOBILE LOCK.
APPLICATION FILED JAN. 24, 1914.

1,118,580.

Patented Nov. 24, 1914.

2 SHEETS—SHEET 1.

Witnesses
Chas. W. Stauffer
C. E. McGraw

Inventor
Paul R. Pohler;
By Barthold Barthel
Attorneys

P. R. POHLER.
AUTOMOBILE LOCK.
APPLICATION FILED JAN. 24, 1914.
1,118,580.
Patented Nov. 24, 1914.
2 SHEETS—SHEET 2.
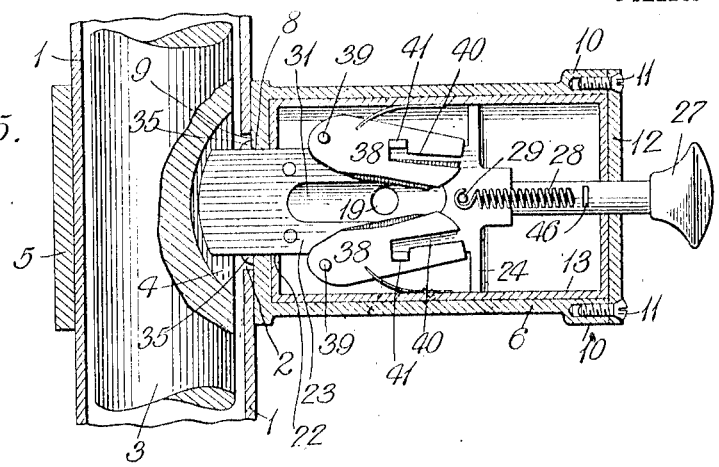
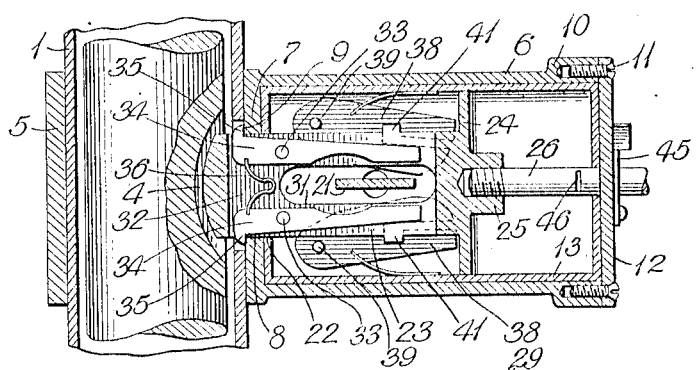
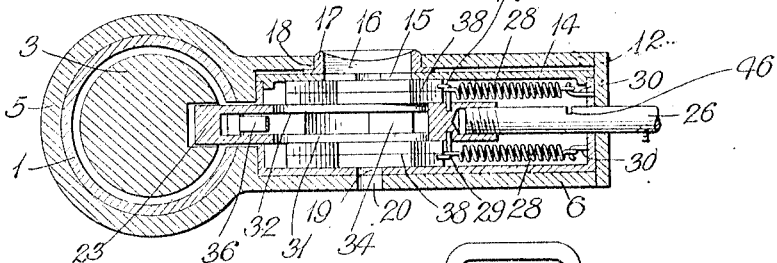
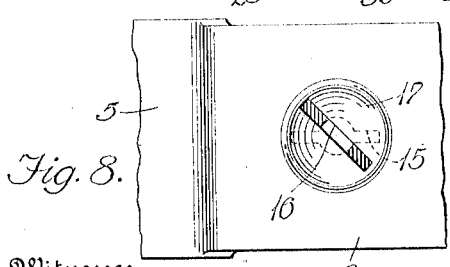
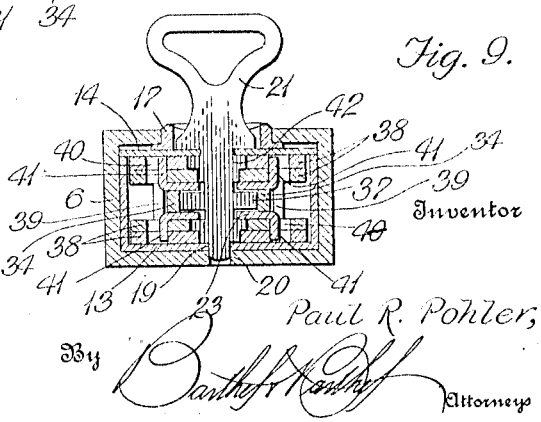
Inventor
Paul R. Pohler,

UNITED STATES PATENT OFFICE.

PAUL R. POHLER, OF DETROIT, MICHIGAN.

AUTOMOBILE-LOCK.

1,118,580.  Specification of Letters Patent.  Patented Nov. 24, 1914.

Application filed January 24, 1914. Serial No. 814,037.

*To all whom it may concern:*

Be it known that I, PAUL R. POHLER, a subject of the Emperor of Germany, residing at Detroit, in the county of Wayne and State of Michigan, have invented certain new and useful Improvements in Automobile-Locks, of which the following is a specification, reference being had therein to the accompanying drawings.

This invention relates to an automobile lock, and the primary object of my invention is to provide a steering post with a novel lock for holding the steering rod or shaft whereby the steering mechanism of the automobile cannot be operated, thereby precluding any possibility of the automobile being stolen or surreptitiously used.

A further object of my invention is to provide a strong and durable key operated lock mechanism that is easy to install and highly efficient for the purposes for which it is intended.

I accomplish the above and other results by a mechanical construction that will be hereinafter specifically described and then claimed, and reference will now be had to the drawing, wherein—

Figure 2:
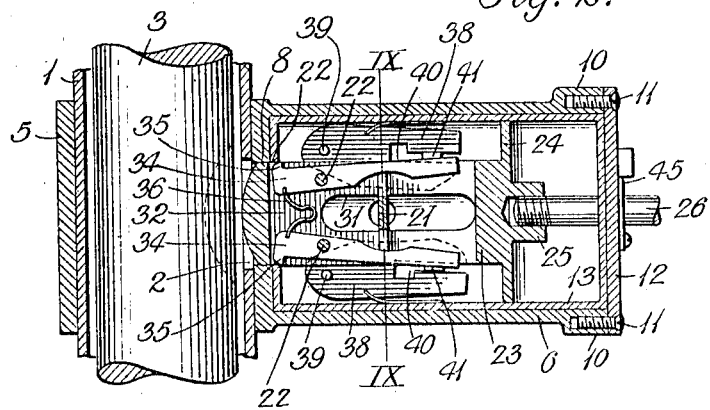
Figure 3:
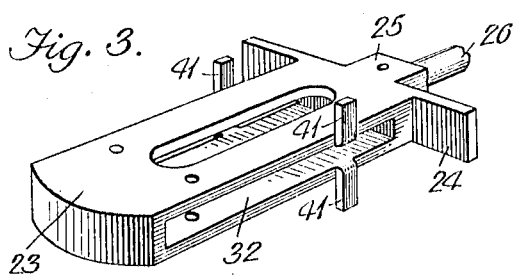
Figure 4:
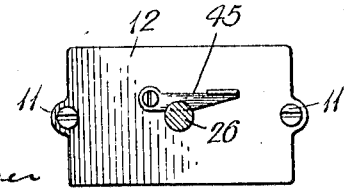

Figure 1 is a side elevation of a portion of an automobile provided with my improved lock; Fig. 2 is an enlarged longitudinal sectional view of the lock showing the bolt in a retracted position; Fig. 3 is a perspective view of the bolt of the lock; Fig. 4 is an end view of the lock showing a catch; Fig. 5 is a longitudinal sectional view of the lock casing showing the lock mechanism in elevation and the bolt extended; Fig. 6 is a longitudinal sectional view of the lock showing the bolt in an extended position; Fig. 7 is a horizontal sectional view of the lock; Fig. 8 is a side elevation of a portion of a lock, and Fig. 9 is a cross section of the same taken on the line IX—IX of Fig. 2;

To use my lock in connection with a steering post, it is only necessary to provide a tubular steering post 1 with a slot 2 and the steering rod or shaft 3 within the post with a recess 4 adapted to register with the slot 2.

Mounted or otherwise secured upon the tubular steering post 1 over that portion of the post having the slot 2 is a sleeve 5 provided with a rectangular lock casing 6 that extends radially from the side of the post 1 provided with the slot 2. The inner end wall 7 of the casing 6 is provided with a slot 8 of less length than the slot 2, thereby providing shoulders 9, the purpose of which will presently appear. The outer end of the casing 6 is formed with bosses 10 to receive screws 11 or other fastening means employed for retaining a detachable end wall or lid 12 in engagement with the casing 6.

Arranged within the casing 6 is a box like shell 13 having a detachable front wall 14. The front wall 14 has a key slot 15 and adapted to register with the slot is a similar slot 16 in a revoluble key plate 17 loosely mounted in an opening 18 provided therefor in the front wall of the casing 6. The key plate 17 is of the ordinary and well known type and is retained within an opening 18 in the detachable front wall 14 by the peripheral flanged inner edge of the key plate. The rear wall of the shell 13 has an opening 19 registering with an opening 20 in the rear wall of the casing 6, said openings accommodating the end of a key 21 inserted in the lock, as best shown in Fig. 9. The inner end of the shell 13 is provided with a guide slot 22 registering with the slot 8 in the casing 6 and slidably mounted in the slot 22 is a bolt 23 adapted to enter the recess 4 of the steering rod or shaft 3 and prevent said rod or shaft from being rotated relatively to the tubular post 1. The outer end of the bolt 23 has a cross head 24 that engages the top and bottom walls of the shell 13 and coöperates with the walls of the slot 22 in guiding a longitudinal movement of the bolt 23 within said shell. The same end of the bolt has a boss 25 and detachably mounted in said boss is the inner end of a push rod or pin 26, which extends through an opening provided therefor in the detachable end wall or lid 12 of the casing 6. The outer end of the push rod or pin is provided with a button 27 to facilitate shifting the bolt within the shell 13. The bolt is held normally retracted by coiled retractile springs 28 arranged at the sides of the push rod or pin 26 and connected to the bolt, as at 29 and to the end wall of the shell 13, as at 30.

The bolt 23 is provided with a transverse key opening 31 and a longitudinal vertical latch slot 32 of greater length than the key opening 31. Pivotally mounted in the slot 32 by transverse pins 33 are opposed latches 34 having hook-shaped ends 35 adapted to engage the shoulders 9 of the casing 6 and retain the bolt 23 in a locked position, as best shown in Fig. 6. A compression spring 36 mounted in the slot 32 engages the hook-shaped ends 35 of the latches 34 and holds the ends of the latches in an extended position. To retract the hook-shaped ends of the latches the key 21 is inserted in the lock and diametrically opposed bits 37 of said key are brought into engagement with the concave confronting sides of the pivoted latches.

To hold the bolt 23 in an extended position with the steering rod or shaft 3 locked relatively to the steering post 1, a plurality of tumblers 38 are used. The tumblers are preferably eight in number and are arranged in sets of two. The tumblers are pivotally mounted upon transverse pins 39 carried by the side walls of the shell 13 and said tumblers have the free ends thereof provided with bayonet-shaped slots 40 into which extends angle lugs 41 of the bolt 23. By providing the bolt with the slots 31 and 32, the central portion of the bolt presents four walls, as best shown in Fig. 5 and the lugs 41 are formed integral with the upper and lower edges of said walls and extend at right angles thereto into the bayonet-shaped slots 40 of the sets of tumblers. The tumblers 38 extend into the slots 32 and are held in the path of bits 42 of the key 21 by flat compression springs 43 carried by the walls of the shell 13.

When a key of the proper shape is inserted in the lock and rotated the hook-shaped ends 35 of the latches 34 are retracted and simultaneous with the shifting of the latches 34 the tumblers 38 are moved to place the longitudinal portions of the slots 40 in alinement with the lugs 41, whereby the springs 28 can retract the bolt 23 and thus release the steering rod or shaft 3 relatively to the tubular steering post 1.

When it is desired to lock the steering rod or shaft 3 it is only necessary to push inwardly upon the button 27. The beveled edges of the hook-shaped ends 35 of the latches 34 cause said latches to recede as the hook-shaped ends thereof engage the walls of the slots 22 and 8 and immediately upon the bolt 23 reaching an extended position the latches are released to engage the shoulders 9 and lock the bolt 23. By this time the angle lugs 41 of the bolt are located in the inner ends of the slots 40 of the tumblers, and even though the detachable end wall or lid 12 be removed, it is impossible to withdraw the shell 13 from the casing 6 until a key of proper shape is inserted in the lock to actuate the tumblers and latches thereof. To prevent the bolt of the lock from being accidentally actuated while an automobile is being driven, a small catch 45 is pivotally mounted upon the lid 12 of the casing 6 to engage in a notch or groove 46 of the rod 26 and retain the rod and bolt thereof in a retracted position.

It is thought that the operation and utility of the lock will be apparent without further description, and while in the drawing there is illustrated a preferred embodiment of my invention, it is to be understood that the structural elements are susceptible to such changes, as in the size, shape and manner of assemblage as fall within the scope of the appended claims.

What I claim is:—

1. In a lock, a member having a recess, a lock casing adjacent to said member, a shell arranged within said casing, a bolt movable in said shell and adapted to extend into the recess of said member, means arranged within said shell adapted to engage said bolt and retain said bolt in an extended position, and means carried by said bolt and adapted to lock said bolt in an extended position and said shell within said casing.

2. In a lock, the combination with a hollow tube having a member therein rotatable relatively thereto and provided with a recess, of a casing mounted upon said hollow tube, a bolt movable longitudinally of said casing and adapted to extend into said hollow tube and into the recess of said member to prevent said member from rotating relatively to said hollow tube, latches arranged in said bolt and adapted to lock said bolt in an extended position, a plurality of tumblers arranged within the said casing and adapted to hold said bolt in an extended position independently of said latches, and a key adapted to be inserted in said lock casing to simultaneously shift said latches and said tumblers.

3. In a lock, the combination with a hollow tube having a member therein rotatable relatively thereto and provided with a recess, of a casing mounted upon said hollow tube, a bolt movable longitudinally of said casing and adapted to extend into said hollow tube and into the recess of said member to prevent said member from rotating relatively to said hollow tube, latches arranged in said bolt and adapted to lock said bolt in an extended position, a plurality of tumblers arranged within the said casing and adapted to hold said bolt in an extended position independently of said latches, a key adapted to be inserted in said lock casing to simultaneously shift said latches and said tumblers, and means within said casing adapted to retract said bolt when released by said latches and said tumblers.

4. In a lock, the combination with a hollow tube having a member therein rotatable relatively thereto, said member having a recess, of a lock casing adjacent to said member, a slotted bolt movable longitudinally of said casing and adapted to extend into the recess of said member, a plurality of tumblers arranged in said casing for holding said bolt in an extended position, means arranged in the slots of said bolt for locking said bolt in an extended position, a key adapted to be inserted in said lock casing to simultaneously move said tumblers and said means whereby said bolt is released, and means within said casing adapted to retract said bolt when released.

5. In a lock, the combination with a member having a recess, of a lock casing adjacent to said member, a bolt movable longitudinally of said casing and adapted to be extended into the recess of said member, opposed spring pressed latches carried by said bolt and having hook-shaped ends adapted to engage said casing to retain said bolt in an extended position, sets of spring pressed tumblers arranged in said casing to engage said bolt, a key adapted to be inserted in said casing, bits carried by said key for simultaneously engaging said latches and said tumblers when said key is rotated, and means within said casing adapted to retract said bolt when released by said latches and said tumblers.

6. In a lock, the combination with a hollow tube having a member therein rotatable relatively thereto and provided with a recess, of a casing fixed relatively to said tube, a shell arranged within said casing, a bolt movable longitudinally of said shell and adapted to be manually extended into the recess of said member, key operated tumblers arranged in said shell and adapted to engage said bolt and retain said bolt in an extended position, and key actuated means carried by said bolt and adapted to lock said bolt in an extended position and said shell within said casing.

7. In a lock, the combination with a hollow tube having a member therein rotatable relatively thereto and provided with a recess, of a casing fixed relatively to said hollow tube, a shell arranged within said casing, a bolt movable longitudinally of said shell and adapted to be manually extended into the recess of said member, key operated tumblers arranged in said shell and adapted to engage said bolt and retain said bolt in an extended position, and key actuated means carried by said bolt and adapted to lock said bolt in an extended position and said shell within said casing, and means within said shell adapted to retract said bolt when released by said latches and said tumblers.

8. In a lock, the combination with a hollow tube having a member therein rotatable relatively thereto and provided with a recess, of a casing fixed relatively to said hollow tube, a shell arranged in said casing, a bolt movable longitudinally of said shell and adapted to extend into the recess of said member, and key actuated means carried by said bolt and adapted to simultaneously lock said bolt in an extended position and said shell within said casing.

9. In a lock, the combination with a hollow tube having a member therein rotatable relatively thereto and provided with a recess, of a casing fixed relatively to said hollow tube, a shell arranged in said casing, a bolt movable longitudinally of said shell and adapted to extend into the recess of said member, key actuated means carried by said bolt and adapted to simultaneously lock said bolt in an extended position and said shell within said casing, and means within said shell adapted to retract said bolt when said key operated means is moved to release said bolt.

10. In a lock, the combination with a hollow tube having a member therein rotatable relatively thereto and provided with a recess, of a casing fixed relatively to said hollow tube, a shell arranged in said casing, a bolt slidable longitudinally of said shell and adapted to extend into the recess of said member, spring pressed tumblers arranged in said shell and adapted to engage said bolt and retain said bolt in an extended position relatively to said shell, opposed spring latches arranged in said bolt and adapted to engage said casing when said bolt is in an extended position and lock said shell relatively to said casing, a key adapted to be inserted in said lock, bits carried by said key and adapted to simultaneously engage said latches and said tumblers to release said bolt, means within said shell adapted to retract said bolt when released by said latches and said tumblers, and means connected to said bolt and protruding from said casing to facilitate manually extending said bolt to engage in the recess of said member.

In testimony whereof I affix my signature in presence of two witnesses.

PAUL R. POHLER.

Witnesses:
ANNA M. DORR,
LEWIS E. FLANDERS.